(12) United States Patent
Pras et al.

(10) Patent No.: US 11,081,692 B2
(45) Date of Patent: Aug. 3, 2021

(54) COMPOSITE ELECTRODES

(71) Applicants: SOLVAY SA, Brussels (BE); COMMISSARIAT A L' ENERGIE ATOMIQUE ET AUX ENERGIES ALTERNATIVES, Paris (FR)

(72) Inventors: Olivier Pras, Grenoble (FR); Helene Rouault, Le Versoud (FR); Julio A. Abusleme, Saronno (IT)

(73) Assignees: Solvay SA, Brussels (BE); Commissariat à 'Énergie Atomique et aux Énergies Alternatives, Paris (FR)

( * ) Notice: Subject to any disclaimer, the term of this patent is extended or adjusted under 35 U.S.C. 154(b) by 499 days.

(21) Appl. No.: 15/309,380

(22) PCT Filed: May 6, 2015

(86) PCT No.: PCT/EP2015/059923
§ 371 (c)(1),
(2) Date: Nov. 7, 2016

(87) PCT Pub. No.: WO2015/169835
PCT Pub. Date: Nov. 12, 2015

(65) Prior Publication Data
US 2017/0077505 A1    Mar. 16, 2017

(30) Foreign Application Priority Data
May 7, 2014   (EP) ..................... 14305669

(51) Int. Cl.
| | | |
|---|---|---|
| H01M 4/36 | (2006.01) |
| H01M 4/04 | (2006.01) |
| H01M 4/62 | (2006.01) |
| H01M 4/13 | (2010.01) |
| H01M 10/0525 | (2010.01) |
| H01M 4/133 | (2010.01) |
| H01M 10/058 | (2010.01) |
| H01M 4/136 | (2010.01) |
| H01M 10/052 | (2010.01) |
| H01M 4/66 | (2006.01) |

(52) U.S. Cl.
CPC ......... *H01M 4/366* (2013.01); *H01M 4/0404* (2013.01); *H01M 4/13* (2013.01); *H01M 4/62* (2013.01); *H01M 4/623* (2013.01); *H01M 10/0525* (2013.01); *H01M 4/133* (2013.01); *H01M 4/136* (2013.01); *H01M 4/661* (2013.01); *H01M 10/052* (2013.01); *H01M 10/058* (2013.01)

(58) Field of Classification Search
None
See application file for complete search history.

(56) References Cited

U.S. PATENT DOCUMENTS

| | | |
|---|---|---|
| 6,203,944 B1 | 3/2001 | Turner et al. |
| 2005/0129838 A1 | 6/2005 | Naarmann et al. |
| 2006/0032045 A1 | 2/2006 | Naarmann et al. |
| 2012/0321948 A1* | 12/2012 | Oya ............... H01M 4/0404 429/211 |
| 2013/0288138 A1 | 10/2013 | Tikhonov et al. |
| 2014/0038048 A1* | 2/2014 | Chung ............ H01M 4/622 429/217 |

FOREIGN PATENT DOCUMENTS

| | | |
|---|---|---|
| JP | 2002319405 A1 | 10/2002 |
| WO | 0003444 A1 | 1/2000 |
| WO | 2011121078 A1 | 10/2011 |

* cited by examiner

*Primary Examiner* — Robert S Carrico
(74) *Attorney, Agent, or Firm* — Osha Bergman Watanabe & Burton LLP

(57) ABSTRACT

The present invention pertains to an electrode-forming composition, to use of said electrode-forming composition in a process for the manufacture of a composite electrode, to said composite electrode and to a secondary battery comprising said composite electrode.

14 Claims, No Drawings

COMPOSITE ELECTRODES

This application is a U.S. national stage entry under 35 U.S.C. § 371 of International Application No. PCT/EP2015/059923 filed May 6, 2015, which claims priority to European application No. 14305669.5 filed on May 7, 2014. The entire contents of these applications are explicitly incorporated herein by this reference.

TECHNICAL FIELD

The present invention pertains to an electrode-forming composition, to use of said electrode-forming composition in a process for the manufacture of a composite electrode, to said composite electrode and to a secondary battery comprising said composite electrode.

BACKGROUND ART

Electrochemical devices such as secondary batteries typically comprise a positive electrode, a negative electrode and an electrolyte placed between said electrodes.

Fluoropolymers are known in the art to be suitable as binders for the manufacture of electrodes for use in electrochemical devices such as secondary batteries.

Generally, techniques for manufacturing either positive or negative electrodes involve the use of organic solvents such as N-methyl-2-pyrrolidone for dissolving fluoropolymer binders and homogenizing them with an electro-active material and all other suitable components to produce a paste to be applied to a metal collector.

The role of the organic solvent is typically to dissolve the fluoropolymer in order to bind the electro-active material particles to each together and to the metal collector upon evaporation of the organic solvent.

The polymer binder should properly bind the electro-active material particles together and to the metal collector so that these particles can chemically withstand large volume expansion and contraction during charging and discharging cycles.

For instance, US 2005/0129838 (GAIA AKKUMULATORENWERKE GMBH) Jun. 16, 2005 discloses a process for the manufacture of electrodes for a Lithium-ion battery, said process comprising preparing an electrode material mixture by mixing a Li-intercatable active electrode material, a supporting electrolyte and a solvent, mixing the electrode material mixture with a binder, homogenizing the electrode material mixture until the electrode mass is present as a single phase suspension, applying the active electrode mass as a homogeneous coating onto a conductor, drying the electrode mass applied to the conductor, and adjusting the electrode mass to a desired layer thickness. The binder is preferably a fluoropolymer. The solvent is typically an aprotic solvent selected from alkyl carbonates, glycol ethers and perfluoroethers.

Also, JP 2002/319405 (TOYOTA MOTOR CORPORATION) Oct. 31, 2002 discloses positive electrodes for a Lithium-ion secondary battery, said positive electrodes being obtainable from a composition wherein a positive electro-active material and a silane coupling agent are dissolved in an organic solvent. The composition may further comprise a binding agent and an electrically-conductive material.

Electrolytes suitable for use in electrochemical devices such as secondary batteries typically include liquid electrolytes and solid electrolytes, in particular polymer electrolytes.

In order for electrolytes to be suitable for use in secondary batteries, they should exhibit high ionic conductivity, high chemical and electrochemical stability toward the electrodes and high thermal stability over a wide range of temperatures.

Liquid electrolytes suitable for use in Lithium-ion secondary batteries typically comprise Lithium salts dissolved in organic solvents.

For instance, WO 2011/121078 (SOLVAY SOLEXIS S.P.A.) Oct. 6, 2011 discloses separators for electrochemical devices based on fluoropolymer-based hybrid organic/inorganic composites obtainable by a process comprising reacting functional fluoropolymers having hydroxyl groups with hydrolysable compounds of Si, Ti or Zr and then hydrolysing and/or polycondensing the compounds thereby provided.

However, critical safety issues may arise from overheating when a liquid electrolyte is heated above its flash point. In particular, thermal runaway may occur at high temperatures through chemical reaction of oxygen released by the cathode material with the organic liquid electrolyte as fuel.

In order to solve safety issues in Lithium-ion secondary batteries, gel polymer electrolytes have been studied which advantageously combine the advantages of both liquid electrolytes and solid polymer electrolytes thus being endowed with high ionic conductivity and high thermal stability.

There is thus still a need in the art for both electrodes and for electrolytes which advantageously enable manufacturing electrochemical devices exhibiting outstanding capacity values.

SUMMARY OF INVENTION

It has been now surprisingly found that by using the fluoropolymer composition of the invention it is possible to manufacture composite electrodes suitable for use in secondary batteries, said composite electrodes exhibiting high adhesion to metal collectors and high cohesion within the electro-active material while enabling high ionic conductivity in the electrochemical devices thereby provided.

In a first instance, the present invention pertains to an electrode-forming composition [composition (C1)] comprising:
- at least one partially fluorinated fluoropolymer [polymer (F)] comprising recurring units derived from at least one fluorinated monomer [monomer (F)] and, optionally, at least one hydrogenated monomer [monomer (H)],
- at least one electro-active compound [compound (EA)],
- an electrolyte medium comprising at least one metal salt [medium (EL)],
- at least one organic solvent [solvent (S)] and
- optionally, at least one conductive agent [compound (C)].

In a second instance, the present invention pertains to the use of the electrode-forming composition [composition (C1)] of the invention in a process for the manufacture of a composite electrode [electrode (CE)] suitable for use in electrochemical devices.

Non-limitative examples of suitable electrochemical devices include secondary batteries.

For the purpose of the present invention, the term "secondary battery" is intended to denote a rechargeable battery.

The secondary battery of the invention is preferably an alkaline or an alkaline-earth secondary battery.

The secondary battery of the invention is more preferably a Lithium-ion secondary battery.

The present invention thus also pertains to a process for the manufacture of a composite electrode [electrode (CE)], said process comprising:
(i) providing an electrode [electrode (E)] comprising:
a metal substrate and
directly adhered onto one surface of said metal substrate, at least one layer [layer (L1)] made from a composition comprising at least one partially fluorinated fluoropolymer [polymer (F)], at least one electro-active compound [compound (EA)] and, optionally, at least one conductive agent [compound (C)];
(ii) providing an electrode-forming composition [composition (C1)];
(iii) applying the composition (C1) provided in step (ii) onto the surface of the electrode (E) provided in step (i) thereby providing a surface-coated electrode; and
(iv) drying the surface-coated electrode provided in step (iii).

The electrode [electrode (E)] is typically obtainable by:
(j) providing a metal substrate;
(jj) applying onto one surface of the metal substrate provided in step (j) an electrode-forming composition [composition (C2)] comprising:
at least one partially fluorinated fluoropolymer [polymer (F)],
at least one electro-active compound [compound (EA)],
at least one organic solvent [solvent (S)] and
optionally, at least one conductive agent [compound (C)]
thereby providing a surface-coated electrode; and
(jjj) drying the surface-coated electrode provided in step (jj).

The composition (C2) is preferably free from the medium (EL).

The metal substrate typically acts as a metal collector.

The metal substrate is generally a foil, mesh or net made from a metal such as copper, aluminum, iron, stainless steel, nickel, titanium or silver.

In a third instance, the present invention pertains to the composite electrode [electrode (CE)] obtainable by the process of the invention.

The composite electrode [electrode (CE)] of the invention typically comprises:
a metal substrate,
directly adhered onto one surface of said metal substrate, at least one layer [layer (L1)] made from a composition comprising at least one partially fluorinated fluoropolymer [polymer (F)], at least one electro-active compound [compound (EA)] and, optionally, at least one conductive agent [compound (C)] and
directly adhered to said layer (L1), at least one layer [layer (L2)] made from a composition comprising at least one partially fluorinated fluoropolymer [polymer (F)], at least one electro-active compound [compound (EA)], an electrolyte medium comprising at least one metal salt [medium (EL)] and, optionally, at least one conductive agent [compound (C)].

The layer (L1) of the electrode (CE) of the invention is preferably free from the medium (EL).

For the purpose of the present invention, the term "electro-active compound [compound (EA)]" is intended to denote a compound which is able to incorporate or insert into its structure and substantially release therefrom alkaline or alkaline-earth metal ions during the charging phase and the discharging phase of an electrochemical device. The compound (EA) is preferably able to incorporate or insert and release lithium ions.

The nature of the compound (EA) of both the layer (L1) and the layer (L2) of the electrode (CE) depends on whether the electrode (CE) thereby provided is a positive composite electrode [electrode (CEp)] or a negative composite electrode [electrode (CEn)].

In the case of forming a positive electrode for a Lithium-ion secondary battery, the compound (EA) may comprise a composite metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1) and spinel-structured $LiMn_2O_4$.

As an alternative, still in the case of forming a positive electrode for a Lithium-ion secondary battery, the compound (EA) may comprise a lithiated or partially lithiated transition metal oxyanion-based electro-active material of formula $M_1M_2(JO_4)_fE_{1-f}$, wherein $M_1$ is lithium, which may be partially substituted by another alkali metal representing less that 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the compound (EA) has formula $Li_{3-x}M'_yM''_{2-y}(JO_4)_3$ wherein 0≤x≤3, 0≤y≤2, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (EA) is a phosphate-based electro-active material of formula $Li(Fe_xMn_{1-x})PO_4$ wherein 0≤x≤1, wherein x is preferably 1 (that is to say, lithium iron phosphate of formula $LiFePO_4$).

In the case of forming a negative electrode for a Lithium-ion secondary battery, the compound (EA) may preferably comprise:
graphitic carbons able to intercalate lithium, typically existing in forms such as powders, flakes, fibers or spheres (for example, mesocarbon microbeads) hosting lithium;
lithium metal;
lithium alloy compositions, including notably those described in U.S. Pat. No. 6,203,944 (3M INNOVATIVE PROPERTIES CO.) Mar. 20, 2001 and/or in WO 00/03444 (MINNESOTA MINING AND MANUFACTURING CO.) Jan. 20, 2000;
lithium titanates, generally represented by formula $Li_4Ti_5O_{12}$; these compounds are generally considered as "zero-strain" insertion materials, having low level of physical expansion upon taking up the mobile ions, i.e. $Li^+$;
lithium-silicon alloys, generally known as lithium silicides with high Li/Si ratios, in particular lithium silicides of formula $Li_{4.4}Si$;
lithium-germanium alloys, including crystalline phases of formula $Li_{4.4}Ge$.

For the purpose of the present invention, the term "partially fluorinated fluoropolymer [polymer (F)]" is intended to denote a polymer comprising recurring units comprising at least one hydrogen atom derived from either at least one fluorinated monomer [monomer (F)] or, optionally, at least one hydrogenated monomer [monomer (H)].

By the term "fluorinated monomer [monomer (F)]" it is hereby intended to denote an ethylenically unsaturated monomer comprising at least one fluorine atom.

By the term "hydrogenated monomer [monomer (H)]" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) is typically obtainable by polymerization of at least one fluorinated monomer [monomer (F)] and, optionally, at least one hydrogenated monomer [monomer (H)].

Non limitative examples of suitable monomers (F) include, notably, the followings:
- $C_2$-$C_8$ perfluoroolefins such as tetrafluoroethylene and hexafluoropropylene;
- $C_2$-$C_8$ hydrogenated fluoroolefins such as vinylidene fluoride, vinyl fluoride, 1,2-difluoroethylene and trifluoroethylene;
- perfluoroalkylethylenes of formula $CH_2=CH-R_{f0}$ wherein $R_{f0}$ is a $C_1$-$C_6$ perfluoroalkyl;
- chloro- and/or bromo- and/or iodo-$C_2$-$C_6$ fluoroolefins such as chlorotrifluoroethylene;
- (per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;
- $CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;
- (per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as —$C_2F_5$—O—$CF_3$;
- functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;
- fluorodioxoles, preferably perfluorodioxoles.

Should the monomer (F) comprise at least one hydrogen atom, it is designated as hydrogen-containing fluorinated monomer [monomer (FH)].

The monomer (F) may further comprise one or more other halogen atoms (Cl, Br, I).

Should the monomer (F) be free of hydrogen atoms, it is designated as per(halo)fluorinated monomer [monomer (FX)].

Should the monomer (F) be a hydrogen-containing fluorinated monomer [monomer (FH)], such as for instance vinylidene fluoride, trifluoroethylene, vinyl fluoride, the polymer (F) is either a polymer comprising recurring units derived from at least one monomer (FH) and, optionally, at least one monomer (F) different from said monomer (FH) or it is a polymer comprising recurring units derived from at least one monomer (FH), optionally, at least one monomer (F) different from said monomer (FH) and, optionally, at least one monomer (H).

Should the monomer (F) be a per(halo)fluorinated monomer [monomer (FX)], such as for instance tetrafluoroethylene, chlorotrifluoroethylene, hexafluoropropylene, perfluoroalkylvinylethers, the polymer (F) is a polymer comprising recurring units derived from at least one monomer (FX), at least one monomer (H) and, optionally, at least one monomer (F) different from said monomer (FX).

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (F) is preferably selected from the group consisting of:
- polymers (F-1) comprising recurring units derived from vinylidene fluoride (VDF) and, optionally, at least one monomer (F) different from VDF, and
- polymers (F-2) comprising recurring units derived from at least one monomer (FX) selected from tetrafluoroethylene (TFE) and chlorotrifluoroethylene (CTFE), at least one monomer (H) selected from ethylene, propylene and isobutylene and, optionally, at least one monomer (F) different from said monomer (FX), typically in an amount of from 0.01% to 30% by moles, based on the total amount of TFE and/or CTFE and said monomer (H).

The polymer (F-1) preferably comprises:
(a) at least 60% by moles, preferably at least 75% by moles, more preferably at least 85% by moles of vinylidene fluoride (VDF) and
(b) optionally, from 0.1% to 15% by moles, preferably from 0.1% to 12% by moles, more preferably from 0.1% to 10% by moles of at least one monomer (F) selected from vinyl fluoride ($VF_1$), chlorotrifluoroethylene (CTFE), hexafluoropropylene (HFP), tetrafluoroethylene (TFE), trifluoroethylene (TrFE), perfluoromethylvinylether (PMVE).

In polymers (F-2) as defined above, the molar ratio monomer(s) (FX)/monomer(s) (H) is typically of from 30:70 to 70:30. In polymers (F-2) as defined above, the monomer (H) is preferably ethylene, optionally in combination with other monomers (H).

Polymers (F-2) wherein the monomer (FX) is predominantly chlorotrifluoroethylene (CTFE) will be identified herein below as ECTFE copolymers; polymers (F-2) wherein the monomer (FX) is predominantly tetrafluoroethylene (TFE) will be identified herein below as ETFE copolymers.

The polymer (F-2) preferably comprises:

(a') from 35% to 65% by moles, preferably from 45% to 55% by moles, more preferably from 48% to 52% by moles of at least one monomer (FX) selected from the group consisting of chlorotrifluoroethylene (CTFE) and tetrafluoroethylene (TFE) and (b') from 35% to 65% by moles, preferably from 45% to 55% by moles, more preferably from 48% to 52% by moles of ethylene (E).

Among polymers (F-2), ECTFE polymers are preferred.

The polymer (F) is even more preferably selected from polymers (F-1) as defined above.

The polymer (F) is typically obtainable by emulsion polymerization or suspension polymerization.

The medium (EL) is typically a liquid medium comprising at least one metal salt.

For the purpose of the present invention, the term "liquid medium" is intended to denote a medium comprising one or more substances in the liquid state at 20° C. under atmospheric pressure.

The medium (EL) is typically free from one or more solvents (S).

The choice of the liquid medium of the medium (EL) is not particularly limited provided that it is suitable for solubilising the metal salt.

The metal salt is typically selected from the group consisting of MeI, Me(PF$_6$)$_n$, Me(BF$_4$)$_n$, Me(ClO$_4$)$_n$, Me(bis(oxalato)borate)$_n$ ("Me(BOB)$_n$"), MeCF$_3$SO$_3$, Me[N(CF$_3$SO$_2$)$_2$]$_n$, Me[N(C$_2$F$_5$SO$_2$)$_2$]$_n$, Me[N(CF$_3$SO$_2$)(R$_F$SO$_2$)]$_n$ with R$_F$ being C$_2$F$_5$, C$_4$F$_9$, CF$_3$OCF$_2$CF$_2$, Me(AsF$_6$)$_n$, Me[C(CF$_3$SO$_2$)$_3$]$_n$, Me$_2$S$_n$, wherein Me is a metal, preferably a transition metal, an alkaline metal or an alkaline-earth metal, more preferably Me being Li, Na, K, Cs, and n is the valence of said metal, typically n being 1 or 2.

The metal salt is preferably selected from the group consisting of LiI, LiPF$_6$, LiBF$_4$, LiClO$_4$, lithium bis(oxalato)borate ("LiBOB"), LiCF$_3$SO$_3$, LiN(CF$_3$SO$_2$)$_2$, LiN(C$_2$F$_5$SO$_2$)$_2$, M[N(CF$_3$SO$_2$)(R$_F$SO$_2$)]$_n$ with R$_F$ being C$_2$F$_5$, C$_4$F$_9$, CF$_3$OCF$_2$CF$_2$, LiAsF$_6$, LiC(CF$_3$SO$_2$)$_3$, Li$_2$S$_n$ and combinations thereof.

The amount of the medium (EL) in the composition (C1) is typically at least 40% by weight, preferably at least 50% by weight, more preferably at least 60% by weight, based on the total weight of said medium (EL) and the polymer (F).

Very good results have been obtained using a composition (C1) comprising at least 50% by weight of the medium (EL), based on the total weight of said medium (EL) and the polymer (F).

The concentration of the metal salt in the medium (EL) is advantageously at least 0.01 M, preferably at least 0.025 M, more preferably at least 0.05 M.

The concentration of the metal salt in the medium (EL) is advantageously at most 1 M, preferably at most 0.75 M, more preferably at most 0.5 M.

According to a first embodiment of the invention, the medium (EL) comprises at least one metal salt and at least one organic carbonate.

Non-limitative examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

According to a second embodiment of the invention, the medium (EL) comprises at least one metal salt, at least one ionic liquid and, optionally, at least one organic carbonate.

For the purpose of the present invention, the term "ionic liquid" is intended to denote a compound formed by the combination of a positively charged cation and a negatively charged anion in the liquid state at temperatures below 100° C. under atmospheric pressure.

The ionic liquid typically contains:

a positively charged cation selected from the group consisting of imidazolium, pyridinium, pyrrolidinium and piperidinium ions optionally containing one or more C$_1$-C$_{30}$ alkyl groups, and a negatively charged anion selected from the group consisting of halides, perfluorinated anions and borates.

Non-limitative examples of C$_1$-C$_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

The positively charged cation of the ionic liquid is preferably selected from the group consisting of:

a pyrrolidinium cation of formula (I):

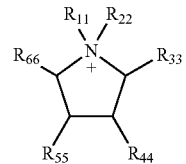

wherein R$_{11}$ and R$_{22}$, equal to or different from each other, independently represent a C$_1$-C$_8$ alkyl group and R$_{33}$, R$_{44}$, R$_{55}$ and R$_{66}$, equal to or different from each other, independently represent a hydrogen atom or a C$_1$-C$_{30}$ alkyl group, preferably a C$_1$-C$_{18}$ alkyl group, more preferably a C$_1$-C$_8$ alkyl group, and a piperidinium cation of formula (II):

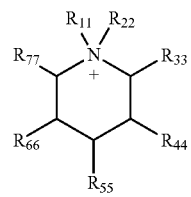

wherein R$_{11}$ and R$_{22}$, equal to or different from each other, independently represent a C$_1$-C$_8$ alkyl group and R$_{33}$, R$_{44}$, R$_{55}$, R$_{66}$ and R$_{77}$, equal to or different from each other, independently represent a hydrogen atom or a C$_1$-C$_{30}$ alkyl group, preferably a C$_1$-C$_{18}$ alkyl group, more preferably a C$_1$-C$_8$ alkyl group.

The positively charged cation of the ionic liquid is more preferably selected from the group consisting of:

a pyrrolidinium cation of formula (I-A):

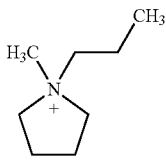

(I-A)

a piperidinium cation of formula (II-A):

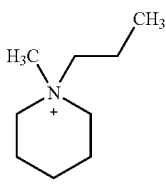

(II-A)

The negatively charged anion of the ionic liquid is preferably selected from the group consisting of:
bis(trifluoromethylsulphonyl)imide of formula $(SO_2CF_3)_2N-$,
hexafluorophosphate of formula $PF_6-$,
tetrafluoroborate of formula $BF_4-$, and
oxaloborate of formula:

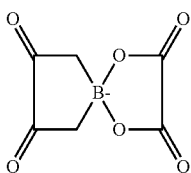 [SMILES: O=C1C[B-]2(CC1=O)OC(=O)C(=O)O2]

The ionic liquid even more preferably contains a pyrrolidinium cation of formula (I-A) as defined above and a perfluorinated anion selected from the group consisting of bis(trifluoromethylsulphonyl)imide of formula $(SO_2CF_3)_2N-$, hexafluorophosphate of formula $PF_6-$ and tetrafluoroborate of formula $BF_4-$.

The choice of the solvent (S) is not particularly limited provided that it is suitable for solubilising the polymer (F).

The solvent (S) is typically selected from the group consisting of:
aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide, dioxane and tetrahydrofuran,
glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether and diethylene glycol mono-n-butyl ether,
glycol ether esters such as ethylene glycol methyl ether acetate, ethylene glycol monoethyl ether acetate and ethylene glycol monobutyl ether acetate,
alcohols such as methyl alcohol, ethyl alcohol and diacetone alcohol,
ketones such as acetone, methylethylketone, methylisobutyl ketone, diisobutylketone, cyclohexanone and isophorone,
linear or cyclic esters such as isopropyl acetate, n-butyl acetate, methyl acetoacetate, dimethyl phthalate and γ-butyrolactone,
linear or cyclic amides such as N,N-diethylacetamide, N,N-dimethylacetamide, dimethylformamide and N-methyl-2-pyrrolidone, and
dimethyl sulfoxide.

For the purpose of the present invention, the term "conductive agent [compound (C)]" is intended to denote a compound able to impart electron conductivity to the electrode.

The compound (C) is typically selected from the group consisting of carbonaceous materials such as carbon black, carbon nanotubes, graphite powder, graphite fiber and metal powders or fibers such as nickel and aluminium powders or fibers.

The composition (C2) preferably comprises:
at least one functional partially fluorinated fluoropolymer [polymer (FF)],
at least one electro-active compound [compound (EA)],
at least one organic solvent [solvent (S)] and
optionally, at least one conductive agent [compound (C)].

For the purpose of the present invention, the term "functional partially fluorinated fluoropolymer [polymer (FF)]" is intended to denote a polymer (F) further comprising a hydrogenated monomer comprising at least one functional end group [monomer (HF)].

The polymer (FF) comprises preferably at least 0.01% by moles, more preferably at least 0.05% by moles, even more preferably at least 0.1% by moles of recurring units derived from at least one monomer (HF).

The polymer (FF) comprises preferably at most 20% by moles, more preferably at most 15% by moles, even more preferably at most 10% by moles, most preferably at most 3% by moles of recurring units derived from at least one monomer (HF).

Determination of average mole percentage of monomer (HF) recurring units in the polymer (FF) can be performed by any suitable method. Mention can be notably made of acid-base titration methods, well suited e.g. for the determination of the acrylic acid content, of NMR methods, adequate for the quantification of monomers (HF) comprising aliphatic hydrogen atoms in side chains, of weight balance based on total fed monomer (HF) and unreacted residual monomer (HF) during polymer (FF) manufacture.

The monomer (HF) typically comprises at least one functional end group selected from a hydroxyl end group and a carboxylic acid end group.

The monomer (HF) is preferably selected from the group consisting of (meth)acrylic monomers of formula (III) and vinylether monomers of formula (IV):

(III)

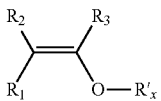

(IV)

wherein each of $R_1$, $R_2$ and $R_3$, equal to or different from each other, is independently a hydrogen atom or a $C_1$-$C_3$ hydrocarbon group, $R_X$ is a hydrogen atom or a $C_1$-$C_5$ hydrocarbon group comprising at least one hydroxyl group and $R'_x$ is a $C_1$-$C_5$ hydrocarbon group comprising at least one hydroxyl group.

The monomer (HF) is more preferably of formula (III) as defined above.

The monomer (HF) is even more preferably of formula (III-A):

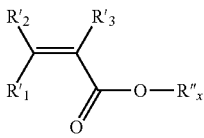

(III-A)

wherein $R'_1$, $R'_2$ and $R'_3$ are hydrogen atoms and $R''_X$ is a hydrogen atom or a $C_1$-$C_5$ hydrocarbon group comprising at least one hydroxyl group.

Non limitative examples of monomers (HF) include, notably, acrylic acid, methacrylic acid, hydroxyethyl(meth)acrylate, hydroxypropyl(meth)acrylate, hydroxyethylhexyl(meth)acrylate.

The monomer (HF) is even more preferably selected from the followings:

acrylic acid (AA) of formula:

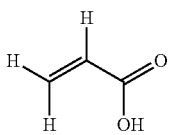

hydroxyethyl acrylate (HEA) of formula:

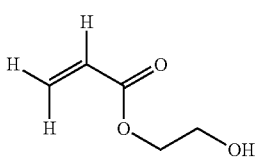

2-hydroxypropyl acrylate (HPA) of either of formulae:

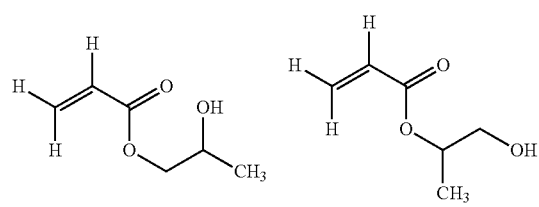

and mixtures thereof.

The polymer (FF) of the composition (C2) is preferably a polymer (FF-1) comprising recurring units derived from vinylidene fluoride (VDF), at least one monomer (HF) comprising at least one functional end group selected from a hydroxyl end group and a carboxylic acid end group and, optionally, at least one monomer (F) different from VDF.

The polymer (FF-1) preferably comprises:

(aa) at least 60% by moles, preferably at least 75% by moles, more preferably at least 85% by moles of vinylidene fluoride (VDF), (bb) optionally, from 0.1% to 15% by moles, preferably from 0.1% to 12% by moles, more preferably from 0.1% to 10% by moles of at least one monomer (F) selected from vinyl fluoride ($VF_1$), chlorotrifluoroethylene (CTFE), hexafluoropropylene (HFP), tetrafluoroethylene (TFE), trifluoroethylene (TrFE), perfluoromethylvinylether (PMVE) and (cc) from 0.01% to 20% by moles, preferably from 0.05% to 18% by moles, more preferably from 0.1% to 10% by moles of at least one monomer (HF) of formula (III) as defined above.

The composite electrode [electrode (CE)] preferably comprises:

a metal substrate,
directly adhered onto one surface of said metal substrate, at least one layer [layer (L1)] made from a composition comprising at least one functional partially fluorinated fluoropolymer [polymer (FF)], at least one electro-active compound [compound (EA)] and, optionally, at least one conductive agent [compound (C)] and
directly adhered to said layer (L1), at least one layer [layer (L2)] made from a composition comprising at least one partially fluorinated fluoropolymer [polymer (F)], at least one electro-active compound [compound (EA)], an electrolyte medium comprising at least one metal salt [medium (EL)] and, optionally, at least one conductive agent [compound (C)].

According to an embodiment of the invention, the composition (C1) comprises:

at least one functional partially fluorinated polymer [polymer (FF-2)] comprising recurring units derived from at least one fluorinated monomer [monomer (F)] and at least one hydrogenated monomer comprising at least one hydroxyl end group [monomer ($H_{OH}$)],
at least one metal compound [compound (M)] of formula (V):

$$X_{4-m}AY_m \qquad (V)$$

wherein m is an integer from 1 to 4 and, according to certain embodiments, from 1 to 3, A is a metal selected from the group consisting of Si, Ti and Zr, Y is a hydrolysable group and X is a hydrocarbon group, optionally comprising one or more functional groups, at least one electro-active compound [compound (EA)],
an electrolyte medium comprising at least one metal salt [medium (EL)],
at least one organic solvent [solvent (S)] and
optionally, at least one conductive agent [compound (C)].

The monomer ($H_{OH}$) is typically selected from the group consisting of (meth)acrylic monomers of formula (III) as defined above, wherein $R_X$ is a $C_1$-$C_5$ hydrocarbon moiety comprising at least one hydroxyl group, and vinylether monomers of formula (IV) as defined above.

The monomer ($H_{OH}$) is preferably of formula (III) as defined above, wherein $R_X$ is a $C_1$-$C_5$ hydrocarbon moiety comprising at least one hydroxyl group.

The monomer ($H_{OH}$) is more preferably of formula (III-A) as defined above, wherein $R''_X$ is a $C_1$-$C_5$ hydrocarbon moiety comprising at least one hydroxyl group.

Non limitative examples of monomers ($H_{OH}$) include, notably, hydroxyethyl(meth)acrylate, hydroxypropyl(meth)acrylate, hydroxyethylhexyl(meth)acrylate.

The polymer (FF-2) comprises preferably at least 0.01% by moles, more preferably at least 0.05% by moles, even more preferably at least 0.1% by moles of recurring units derived from at least one monomer ($H_{OH}$).

The polymer (FF-2) comprises preferably at most 20% by moles, more preferably at most 15% by moles, even more preferably at most 10% by moles, most preferably at most 3% by moles of recurring units derived from at least one monomer ($H_{OH}$).

The polymer (FF-2) preferably comprises recurring units derived from vinylidene fluoride (VDF), at least one monomer ($H_{OH}$) and, optionally, at least one monomer (F) different from VDF.

The polymer (FF-2) more preferably comprises:

(aa') at least 60% by moles, preferably at least 75% by moles, more preferably at least 85% by moles of vinylidene fluoride (VDF), (bb') optionally, from 0.1% to 15% by moles, preferably from 0.1% to 12% by moles, more preferably from 0.1% to 10% by moles of at least one monomer (F) selected from vinyl fluoride ($VF_1$), chlorotrifluoroethylene (CTFE), hexafluoropropylene (HFP), tetrafluoroethylene (TFE), trifluoroethylene (TrFE), perfluoromethylvinylether (PMVE) and (cc') from 0.01% to 20% by moles, preferably from 0.05% to 18% by moles, more preferably from 0.1% to 10% by moles of at least one monomer ($H_{OH}$) of formula (III) as defined above, wherein $R_X$ is a $C_1$-$C_5$ hydrocarbon moiety comprising at least one hydroxyl group.

In case the compound (M) of formula (V) as defined above comprises at least one functional group, it will be designated as functional compound (M); in case none of groups X and Y comprise a functional group, the compound (M) of formula (V) as defined above will be designated as non-functional compound (M).

The non-functional compound (M) typically has formula (V-A):

$$X^1_{4-m1}AY_{m1} \quad (V-A)$$

wherein m1 is an integer from 1 to 4, A is a metal selected from the group consisting of Si, Ti and Zr, Y is a hydrolysable group and $X^1$ is a hydrocarbon group.

The functional compound (M) typically has formula (V-B):

$$X^2_{4-m2}AY_{m2} \quad (V-B)$$

wherein m2 is an integer from 1 to 3, A is a metal selected from the group consisting of Si, Ti and Zr, Y is a hydrolysable group and $X^2$ is a hydrocarbon group comprising one or more functional groups.

Mixtures of one or more functional compounds (M) and one or more non-functional compounds (M) may be used in the process of the invention.

The selection of the hydrolysable group Y of the compound (M) is not particularly limited provided that it enables under appropriate conditions the formation of a —O—A≡ bond. The hydrolysable group Y is typically selected from the group consisting of halogen atoms, preferably being a chlorine atom, hydrocarboxy groups, acyloxy groups and hydroxyl groups.

The compound (M) is preferably of formula (VI):

$$R^A_{4-m'}A(OR^B)_{m'} \quad (VI)$$

wherein m' is an integer from 1 to 4, and, according to certain embodiments, from 1 to 3, A is a metal selected from the group consisting of Si, Ti and Zr, $R^A$ and $R^B$, equal to or different from each other and at each occurrence, are independently selected from $C_1$-$C_{18}$ hydrocarbon groups, optionally comprising one or more functional groups.

Non limitative examples of functional groups include, notably, isocyanate group, epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Should the compound (M) be a non-functional compound (M), it is preferably of formula (VI-A):

$$R^{A'}_{4-m1'}A(OR^{B'})_{m1'} \quad (VI-A)$$

wherein m1' is an integer from 1 to 4, A is a metal selected from the group consisting of Si, Ti and Zr, $R^{A'}$ and $R^{B'}$, equal to or different from each other and at each occurrence, are independently selected from $C_1$-$C_{18}$ hydrocarbon groups.

Non-limitative examples of suitable non-functional compounds (M) include notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Should the compound (M) be a functional compound (M), it is preferably of formula (VI-B):

$$R^{A''}_{4-m2'}A(OR^{B''})_{m2'} \quad (VI-B)$$

wherein m2' is an integer from 1 to 3, A is a metal selected from the group consisting of Si, Ti and Zr, $R^{A''}$, equal to or different from each other and at each occurrence, is a $C_1$-$C_{12}$ hydrocarbon group comprising one or more functional groups, and $R^{B''}$, equal to or different from each other and at each occurrence, is a $C_1$-$C_5$ linear or branched alkyl group, preferably $R^{B''}$ is a methyl or ethyl group.

Non-limitative examples of suitable functional compounds (M) include notably trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate, vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyl-trimethoxysilane) of formula:

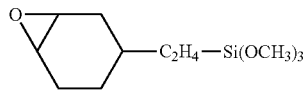

glycidoxypropylmethyldiethoxysilane of formula:

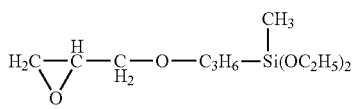

glycidoxypropyltrimethoxysilane of formula:

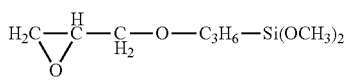

methacryloxypropyltrimethoxysilane of formula:

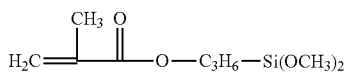

aminoethylaminpropylmethyldimethoxysilane of formula:

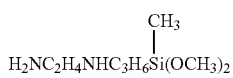

aminoethylaminpropyltrimethoxysilane of formula:

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

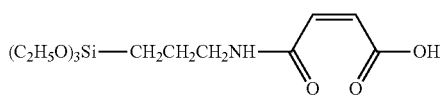

3-(trihydroxysilyl)-1-propane-sulphonic acid of formula HOSO$_2$—CH$_2$CH$_2$CH$_2$—Si(OH)$_3$, N-(trimethoxysilylpropyl)ethylene-diamine triacetic acid, and its sodium salts, 3-(triethoxysilyl)propylsuccinic anhydride of formula:

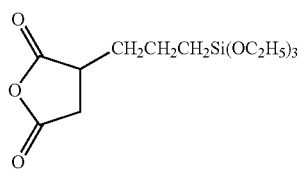

acetamidopropyltrimethoxysilane of formula H$_3$C—C(O)NH—CH$_2$CH$_2$CH$_2$—Si(OCH$_3$)$_3$, alkanolamine titanates of formula Ti(L)$_x$(OR)$_y$, wherein L is an amine-substitued alkoxy group, e.g. OCH$_2$CH$_2$NH$_2$, R is an alkyl group, and x and y are integers such that x+y=4.

According to a variant of this embodiment of the invention, the composition (C1) comprises:
  at least one functional partially fluorinated polymer [polymer (FF-2)] comprising recurring units derived from at least one fluorinated monomer [monomer (F)] and at least one monomer (HF) comprising at least one hydroxyl end group [monomer (H$_{OH}$)],
  at least one non-functional compound (M) of formula (V-A):

$$X^1_{4-m1}AY_{m1} \qquad (V\text{-}A)$$

wherein m1 is an integer from 1 to 4, A is a metal selected from the group consisting of Si, Ti and Zr, Y is a hydrolysable group and X$^1$ is a hydrocarbon group,
  at least one functional compound (M) of formula (V-B):

$$X^2_{4-m2}AY_{m2} \qquad (V\text{-}B)$$

wherein m2 is an integer from 1 to 3, A is a metal selected from the group consisting of Si, Ti and Zr, Y is a hydrolysable group and X$^2$ is a hydrocarbon group comprising one or more functional groups,
  at least one electro-active compound [compound (EA)],
  an electrolyte medium comprising at least one metal salt [medium (EL)],
  at least one organic solvent [solvent (S)] and
  optionally, at least one conductive agent [compound (C)].

The functional compound (M) of the composition (C1) is preferably of formula (V-B) as defined above, wherein X$^2$ is a hydrocarbon group comprising one or more isocyanate groups.

The polymer (FF-2) and one or more compounds (M) are typically reacted in the presence of at least one organic solvent [solvent (S)] thereby providing a composition comprising at least one grafted fluoropolymer [polymer (FG)] comprising:
  a fluorinated main chain comprising recurring units derived from at least one fluorinated monomer [monomer (F)] and at least one hydrogenated monomer [monomer (H)],
  at least one pendant side chain comprising an end group of formula —O-AY$_{m1-1}$X$^1_{4-m1}$ (M1-G), wherein m1 is an integer from 1 to 4, A is a metal selected from the group consisting of Si, Ti and Zr, Y is a hydrolysable group and X$^1$ is a hydrocarbon group, and
  optionally, at least one pendant side chain comprising an end group of formula —O—Z-AY$_{m2}$X$^2_{3-m2}$ (M2-G), wherein m2 is an integer from 1 to 3, A is a metal selected from the group consisting of Si, Ti and Zr, Y is a hydrolysable group, X$^2$ is a hydrocarbon group comprising one or more functional groups and Z is a hydrocarbon group comprising one or more functional groups.

The polymer (FF-2), at least one non-functional compound (M) of formula (V-A) as defined above and at least one functional compound (M) of formula (V-B) as defined above, wherein X$^2$ is a hydrocarbon group comprising one or more isocyanate groups, are typically reacted in the presence of at least one organic solvent [solvent (S)] thereby providing a composition comprising at least one grafted fluoropolymer [polymer (FG)] comprising:
  a fluorinated main chain comprising recurring units derived from at least one fluorinated monomer [monomer (F)] and at least one hydrogenated monomer [monomer (H)], at least one pendant side chain comprising an end group of formula —O-AY$_{m1-1}$X$^1_{4-m1}$ (M1-G), wherein m1 is an integer from 1 to 4, A is a metal selected from the group consisting of Si, Ti and Zr, Y is a hydrolysable group and X$^1$ is a hydrocarbon group, and at least one pendant side chain comprising an end group of formula —O—C(O)—NH—Z'-AY$_{m2}$X$^2_{3-m2}$ (M2'-G), wherein m2 is an integer from 1 to 3, A is a metal selected from the group consisting of Si, Ti and Zr, Y is a hydrolysable group, X$^2$ is a hydrocarbon group comprising one or more functional groups and Z' is a hydrocarbon group, optionally comprising one or more functional groups.

The polymer (FG) typically undergoes hydrolysis and/or condensation thereby providing a composition comprising at least one fluoropolymer hybrid organic/inorganic composite [polymer (FH)].

The fluoropolymer hybrid organic/inorganic composite [polymer (FH)] typically comprises, preferably consists of, fluoropolymer domains consisting of chains obtainable by the polymer (FG) and inorganic domains consisting of residues obtainable by one or more compounds (M).

The hydrolysis and/or condensation is usually carried out at room temperature or upon heating at a temperature lower than 100° C. The temperature will be selected having regards to the boiling point of the solvent (S). Temperatures between 20° C. and 90° C., preferably between 20° C. and 50° C. will be preferred.

It is understood that the hydrolysis and/or condensation reaction may be continued during any one of steps (iii) or (iv) of the process of the invention.

As this will be recognized by the skilled in the art, the hydrolysis and/or condensation usually generates low molecular weight side products, which can be notably water or alcohols, as a function of the nature of the compound (M).

The composition (C1) of the invention advantageously further comprises at least one condensation catalyst.

The condensation catalyst is preferably selected from the group consisting of organic tin compounds.

The condensation catalyst is typically added to the composition (C1) in an amount comprised between 0.1% and 50% by moles, preferably between 1% and 25% by moles, more preferably between 5% and 15% by moles, based on the total amount by moles of one or more compounds (M).

Non-limitative examples of organic tin compounds suitable as condensation catalysts in the process of the invention include, notably, dibutyltin dilaurate, dibutyltin oxide, tributyltin oxide, dioctyltin oxide, methyltin mercaptide, tributyltin chloride and tributyltin fluoride.

An acid catalyst is typically also added to the composition (C1) of the invention.

The selection of the acid catalyst is not particularly limited. The acid catalyst is typically selected from the group consisting of organic and inorganic acids.

The acid catalyst is typically added to the composition (C1) in an amount comprised between 0.5% and 10% by weight, preferably between 1% and 5% by weight, based on the total weight of the composition.

The acid catalyst is preferably selected from the group consisting of organic acids.

Very good results have been obtained with formic acid.

The composite electrode [electrode (CE)] preferably comprises:
a metal substrate,
directly adhered onto one surface of said metal substrate, at least one layer [layer (L1)] made from a composition comprising at least one functional partially fluorinated fluoropolymer [polymer (FF)], at least one electro-active compound [compound (EA)] and, optionally, at least one conductive agent [compound (C)] and
directly adhered to said layer (L1), at least one layer [layer (L2)] made from a composition comprising at least one fluoropolymer hybrid organic/inorganic composite [polymer (FH)], at least one electro-active compound [compound (EA)], an electrolyte medium comprising at least one metal salt [medium (EL)] and, optionally, at least one conductive agent [compound (C)].

The electrode (CE) of the invention is typically dried at a temperature comprised between 25° C. and 200° C.

Drying can be performed either under atmospheric pressure or under vacuum. Alternatively, drying can be performed under modified atmosphere, e.g. under an inert gas, typically exempt notably from moisture (water vapour content of less than 0.001% v/v).

The drying temperature will be selected so as to effect removal by evaporation of one or more solvents (S) from the electrode (CE) of the invention.

The electrode (CE) of the invention is preferably free from one or more solvents (S).

The layer (L1) of the electrode (CE) of the invention typically has a thickness comprised between 2 μm and 100 μm, preferably between 2 μm and 50 μm, more preferably between 5 μm and 20 μm.

The layer (L2) of the electrode (CE) of the invention typically has a thickness comprised between 10 μm and 500 μm, preferably between 50 μm and 250 μm, more preferably between 70 μm and 150 μm.

In a fourth instance, the present invention pertains to a secondary battery comprising:
a positive electrode,
a negative electrode and
between said positive electrode and negative electrode, a membrane, wherein at least one of the positive electrode and the negative electrode is the composite electrode [electrode (CE)] of the invention.

The present invention thus also pertains to a process for the manufacture of a secondary battery, said process comprising assembling a membrane between a positive electrode and a negative electrode, wherein at least one of the positive electrode and the negative electrode is the composite electrode [electrode (CE)] of the invention.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

The membrane is typically made from a composition comprising at least one material selected from inorganic and organic materials.

Non-limitative examples of suitable organic materials include, notably, polymers, said polymers being preferably selected from the group consisting of polymers (F) such as polymers (FF) and polymers (FH).

The membrane is typically obtainable by processing into a membrane a composition comprising a liquid medium comprising at least one solvent (S) and at least one polymer selected from the group consisting of polymers (F) such as polymers (FF) and polymers (FH), and then drying the membrane thereby provided.

The membrane is preferably a polymer electrolyte membrane further comprising at least one medium (EL) as defined above.

The membrane preferably comprises, more preferably consists of, a composition comprising at least one polymer (FH) and at least one medium (EL) as defined above.

According to a first embodiment of the invention, the secondary battery comprises:
- a positive composite electrode [electrode (CEp)]
- a negative electrode [electrode (En)] and
- between said electrode (CEp) and electrode (En), a membrane.

According to a second embodiment of the invention, the secondary battery comprises:
- a positive composite electrode [electrode (CEp)]
- a negative composite electrode [electrode (CEn)] and
- between said electrode (CEp) and electrode (CEn), a membrane.

It has been found that the secondary battery of the invention successfully exhibits outstanding capacity values.

It has been also found that by the process of the invention it is possible to manufacture secondary batteries by advantageously avoiding injection of the electrolyte into the secondary battery thereby provided.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-A): VDF-AA copolymer.

Polymer (F-B): VDF-HFP copolymer having a melting point of about 148.5-149° C. and a viscosity of 0.28-0.29 l/g in DMF at 25° C.

Polymer (F-C): VDF-HEA (1% by moles)-HFP (2.3% by moles) having a Melt Flow Index (MFI) of 15 g/min (2.16 Kg, 230° C.).

TSPI: 3-(triethoxysilyl)propyl isocyanate
DBTDL: dibutyltin dilaurate
LiTFSI: bis(trifluoromethanesulfonyl)imide lithium salt
TEOS: $Si(OC_2H_5)_4$
Graphite: 75% SMG HE2 (Hitachi Chemical Co., Ltd.)/ 25% TIMREX® SFG 6

Adhesion Tests of the Electrodes

The interlayer adhesion strength between the layer (L1) and the layer (L2) of the electrodes was measured according to the following procedure: a stripe of SCOTCH® 3M467M adhesive was firmly sticked on a stainless steel plaque and the other side of the stripe was sticked to the electrode. The adhesion strength of this stripe to the electrode was enhanced by pressing 3 times with a stainless steel roll on it. The standard delamination was measured at 180° and the force was measured in N/m. The drawing speed was 300 mm/min at room temperature.

General Procedure for the Preparation of the Composite Electrodes

General Procedure for the Preparation of the First Layer [Layer (L1)]

A 12% by weight solution of polymer (F-A) in N-methyl 2-pyrrolidone (NMP) was prepared at 60° C. and then brought to room temperature.

Anode: Graphite was added to the solution so obtained in a weight ratio 96/4 (graphite/polymer (F-A)).

Cathode: A composition comprising a blend of 50% by weight of C-NERGY® SUPER C65 carbon black and 50% by weight of VGCF® carbon fiber (CF) and $LiFePO_4$ (LFP) was added to the solution so obtained in a weight ratio 95.5/4.5 ((CF+LFP)/polymer (F-A)). The CF/LFP weight ratio was 4/96.

Casting Procedure

The solution mixture was spread with a constant thickness onto a metal collector using a tape casting machine (doctor blade). The thickness was controlled by the distance between the knife and the metal collector. The thickness of the layer (L1) either for the anode or the cathode was about 15 μm.

NMP was evaporated by drying at 60° C. during one night and the electrode was obtained.

General Procedure for the Preparation of the Second Layer [Layer (L2)]

(I) Gel Polymer [Layer (L2-A)]

A solution of polymer (F-B) in acetone was prepared at 60° C. and then brought to room temperature.

In the next step, an electrolyte medium was added, said electrolyte medium consisting of a mixture of ethylene carbonate (EC)/propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-B)})]$ was 66%.

Anode: Graphite was added to the solution so obtained in a weight ratio 85/15 (graphite/polymer (F-B)).

Cathode: A composition comprising a blend of 50% by weight of C-NERGY® SUPER C65 carbon black and 50% by weight of VGCF® carbon fiber (CF) and $LiFePO_4$ (LFP) was added to the solution so obtained in a weight ratio 85/15 ((CF+LFP)/polymer (F-B)). The CF/LFP weight ratio was 4/96.

(II) Gel Hybrid Polymer [Layer (L2-B)]

A 15% by weight solution of polymer (F-C) in acetone was prepared at 60° C. and then brought to room temperature. Then, DBTDL (10% by moles of TSPI) was mixed into the solution and homogenized at 60° C. TSPI (1.1% by moles vs. polymer (F-C)) was then added at room temperature. Once again, the solution was homogenized at 60° C. and brought to room temperature.

In the next step, an electrolyte medium was added, said electrolyte medium consisting of a mixture of ethylene carbonate (EC)/propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-C)})]$ was 66%.

After homogenization at 60° C., formic acid was added. The solution was then brought to room temperature and TEOS was added thereto.

The quantity of TEOS was calculated from the weight ratio $(m_{SiO2}/m_{polymer\ (F-C)})$ assuming total conversion of TEOS into $SiO_2$. This ratio was 10%.

The quantity of formic acid was calculated from the following equation:

$$n_{formic\ acid}/n_{TEOS} = 7.8$$

Anode: Graphite was added to the solution so obtained in a weight ratio 85/15 (graphite/polymer (F-C)).

Cathode: A composition comprising a blend of 50% by weight of C-NERGY® SUPER C65 carbon black and 50% by weight of VGCF® carbon fiber (CF) and $LiFePO_4$ (LFP)

was added to the solution so obtained in a weight ratio 85/15 ((CF+LFP)/polymer (F-C)). The CF/LFP weight ratio was 4/96.

Casting Procedure

The solution mixture was spread with a constant thickness onto a metal collector using a tape casting machine (doctor blade). The thickness was controlled by the distance between the knife and the metal collector. The thickness of the layer (L2) for the anode after drying was about 120 μm. The thickness of the layer (L2) for the cathode after drying was about 250 μm.

The viscosity of the dispersion was tuned by adding more acetone if necessary for applying properly the layer (L2) onto the layer (L1) of the electrode.

The solvent was quickly evaporated from the solution mixture and the gel electrode was obtained.

General Procedure for the Preparation of the Membrane

Preparation of the Solution Mixture

The polymer (F-C) (1.5 g) was dissolved in 8.5 g of acetone at 60° C. thereby providing a solution containing 15% by weight of the polymer (F-C). The solution was homogeneous and transparent after homogenization at room temperature. DBTDL (0.015 g) was then added. The solution was homogenized at 60° C. and then brought to room temperature. TSPI (0.060 g) was added thereto. The quantity of DBTDL was calculated to be 10% by moles vs. TSPI. TSPI itself was calculated to be 1.1% by moles vs. the polymer (F-C). Once again, the solution was homogenized at 60° C. and then it was left at 60° C. for about 90 min so as to let isocyanate functional groups of TSPI to react with the hydroxyl groups of the polymer (F-C). The solution was then brought to room temperature.

In the next step, an electrolyte medium was added, said electrolyte medium consisting of a mixture of ethylene carbonate (EC)/propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-C)})]$ was 66%.

After homogenization at 60° C., formic acid was added. The solution was homogenized at 60° C. and then brought to room temperature. TEOS was added thereto.

The quantity of TEOS was calculated from the weight ratio $(m_{SiO2}/m_{polymer\ (F-C)})$ assuming total conversion of TEOS into $SiO_2$. This ratio was 10%.

The quantity of formic acid was calculated from the following equation:

$$n_{formic\ acid}/n_{TEOS} = 7.8$$

Casting of the Solution: Membrane Formation

The solution mixture was spread with a constant thickness onto PET substrate using a tape casting machine (doctor blade). The thickness was controlled by the distance between the knife and the PET film. We used a value of 150 μm.

The solvent was quickly evaporated from the solution mixture and the membrane was obtained. After a few hours, the membrane was detached from the PET substrate. The membrane so obtained had a constant thickness of 20 μm.

EXAMPLE 1

Anode

The anode was formed of:
a metal collector,
a layer (L1) prepared as detailed above, and
a layer (L2-B) prepared as detailed above.

Adhesion strength: a force of 34 N/m was measured between the layer (L1) and the layer (L2-B).

The layer (L1) was well adhered to the metal collector.

COMPARATIVE EXAMPLE 1

Anode

The anode was formed of:
a metal collector and
a layer (L2-B) prepared as detailed above.

Adhesion strength: a force of 0.49 N/m was measured between the layer (L2-B) and the metal collector.

The layer (L2-B) was poorly adhered to the metal collector.

EXAMPLE 2

Cathode

The cathode was formed of:
a metal collector,
a layer (L1) prepared as detailed above, and
a layer (L2-B) prepared as detailed above.

Adhesion strength: a force of 58 N/m was measured between the layer (L1) and the layer (L2-B).

The layer (L1) was well adhered to the metal collector.

COMPARATIVE EXAMPLE 2

Cathode

The cathode was formed of:
a metal collector and
a layer (L2-B) prepared as detailed above.

No interlayer adhesion was observed between the layer (L2-B) and the metal collector.

EXAMPLE 3

Anode

The anode was formed of:
a metal collector,
a layer (L1) prepared as detailed above, and
a layer (L2-A) prepared as detailed above.

Adhesion strength: a force of 150 N/m was measured between the layer (L1) and the layer (L2-A).

The layer (L1) was well adhered to the metal collector.

COMPARATIVE EXAMPLE 3

Anode

The anode was formed of:
a metal collector and
a layer (L2-A) prepared as detailed above.

No interlayer adhesion was observed between the layer (L2-A) and the metal collector.

EXAMPLE 4

Manufacture of a Lithium-Ion Battery

A coin cell was prepared by placing the membrane as described above between the cathode of Example 2 (with a weight ratio $m_{electrolyte}/(m_{electrolyte}+m_{polymer\ (F-C)})$ of 75% (instead of 66%), a (CF+LFP)/polymer (F-C) weight ratio of 90/10 (instead of 85/15)) and a CF/LFP weight ratio of 11/89 (instead of 4/96) and the anode of Example 1.

The discharge capacity values of the coin cell so obtained at different discharge rates are set forth in Table 1 here below.

TABLE 1

| Rate | | Average Discharge [mAh/g] | [%] |
|---|---|---|---|
| 0.05 | Discharge D/20 | 96.3 | 100 |
| 0.1 | Discharge D/10 | 80.2 | 83 |
| 0.2 | Discharge D/5 | 61.1 | 63 |
| 0.5 | Discharge D/2 | 18.3 | 19 |
| 1 | Discharge D | 10.4 | 10 |
| 2 | Discharge 2D | 0.02 | 0.02 |
| 0.05 | Discharge D/20 | 81.5 | 85 |

COMPARATIVE EXAMPLE 4

A coin cell was prepared by placing the membrane as described above between the layer (L1) of the cathode of Example 2 and the layer (L1) of the anode of Example 1.

The battery thereby provided did not work.

It has been thus found that the composite electrode [electrode (CE)] of the invention advantageously enables providing for electrochemical devices exhibiting high capacity values.

The invention claimed is:

1. An electrode-forming composition [composition (C1)] comprising:
at least one partially fluorinated fluoropolymer [polymer (F)], wherein polymer (F) is a functional partially fluorinated polymer [polymer (FF-2)] comprising recurring units derived from at least one fluorinated monomer [monomer (F)] and at least one hydrogenated monomer comprising at least one hydroxyl end group [monomer $(H_{OH})$],
at least one electro-active compound [compound (EA)], at least one metal compound [compound (M)] of formula (V):

$$X_{4-m}AY_m \quad (V)$$

wherein m is an integer from 1 to 4, A is a metal selected from the group consisting of Si, Ti and Zr, Y is a hydrolysable group and X is a hydrocarbon group, optionally comprising one or more functional groups,
an electrolyte medium comprising at least one metal salt [medium (EL)],
at least one organic solvent [solvent (S)] selected from the group consisting of alcohols, ketones, linear or cyclic esters, linear or cyclic amides and dimethyl sulfoxide, and
optionally, at least one conductive agent [compound (C); wherein at least one of the metal compounds (M) is grafted to polymer (FF-2) by at least one of the hydroxyl end groups of the hydrogenated monomer $(H_{OH})$ through at least one —O-A bond.

2. The composition (C1) according to claim 1, wherein the polymer (F) is selected from the group consisting of:
polymers (F-1) comprising recurring units derived from vinylidene fluoride (VDF) and, optionally, at least one fluorinated monomer [monomer (F)] different from VDF, and
polymers (F-2) comprising recurring units derived from at least one per(halo)fluorinated monomer [monomer (FX)] selected from tetrafluoroethylene (TFE) and chlorotrifluoroethylene (CTFE), at least one hydrogenated monomer [monomer (H)] selected from ethylene, propylene and isobutylene and, optionally, at least one monomer (F) different from said monomer (FX).

3. The composition (C1) according to claim 1, wherein the compound is of formula (VI):

$$R^A_{4-m'}A(OR^B)_{m'} \quad (VI)$$

wherein m' is an integer from 1 to 4, A is a metal selected from the group consisting of Si, Ti and Zr, $R^A$ and $R^B$, equal to or different from each other and at each occurrence, are independently selected from $C_1$-$C_{18}$ hydrocarbon groups, optionally comprising one or more functional groups.

4. The composition (C1) according to claim 1, wherein the compound is either a non-functional compound (M) or a functional compound (M).

5. The composition (C1) according to claim 1, wherein the medium (EL) comprises the at least one metal salt and at least one organic carbonate.

6. The composition (C1) according to claim 1, wherein the medium (EL) comprises the at least one metal salt, at least one ionic liquid and, optionally, at least one organic carbonate.

7. A process for the manufacture of a composite electrode [electrode (CE)], said process comprising:
(i) providing an electrode [electrode (E)] comprising:
a metal substrate and
directly adhered onto one surface of said metal substrate, at least one layer [layer (L1)] made from a composition comprising at least one functional partially fluorinated fluoropolymer [polymer (FF)], at least one electro-active compound [compound (EA)] and, optionally, at least one conductive agent [compound (C)];
(ii) providing the electrode-forming composition [composition (C1)] according to claim 1;
(iii) applying the composition (C1) provided in step (ii) onto the surface of the electrode (E) provided in step (i) thereby providing a surface-coated electrode; and
(iv) drying the surface-coated electrode provided in step (iii).

8. The process according to claim 7, wherein the electrode [electrode (E)] is obtainable by:
(j) providing a metal substrate;
(jj) applying onto one surface of the metal substrate provided in step (j) an electrode-forming composition [composition (C2)] comprising:
at least one functional partially fluorinated fluoropolymer [polymer (FF)],
at least one electro-active compound [compound (EA)],
at least one organic solvent [solvent (S)] and
optionally, at least one conductive agent [compound (C)]
thereby providing a surface-coated electrode; and
(jjj) drying the surface-coated electrode provided in step (jj).

9. The process according to claim 8, wherein the composition (C2) is free from an electrolyte medium comprising at least one metal salt [medium (EL)].

10. The process according to claim 7, wherein the polymer (FF) is a functional partially fluorinated fluoropolymer [polymer (FF-1)] comprising recurring units derived from vinylidene fluoride (VDF), at least one hydrogenated monomer comprising at least one functional end group [monomer (HF)], said monomer (HF) comprising at least one functional end group selected from a hydroxyl end group and a carboxylic acid end group, and, optionally, at least one monomer (F) different from VDF.

11. The process according to claim 10, wherein the monomer (HF) is of formula (III-A):

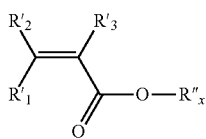

(III-A)

wherein R'1, R'2 and R'3 are hydrogen atoms and R"X is a hydrogen atom or a C1-C5 hydrocarbon group comprising at least one hydroxyl group.

12. A composite electrode [electrode (CE)] obtained by the process according to claim 7.

13. The electrode (CE) according to claim 12, comprising:
a metal substrate,
directly adhered onto one surface of said metal substrate, at least one layer [layer (L1)] made from a composition comprising at least one functional partially fluorinated fluoropolymer [polymer (FF)], at least one electro-active compound [compound (EA)] and, optionally, at least one conductive agent [compound (C)] and
directly adhered to said layer (L1), at least one layer [layer (L2)] made from a composition comprising at least one partially fluorinated fluoropolymer [polymer (F)], at least one electro-active compound [compound (EA)], an electrolyte medium comprising at least one metal salt [medium (EL)] and, optionally, at least one conductive agent [compound (C)].

14. A secondary battery comprising:
a positive electrode,
a negative electrode and
between said positive electrode and negative electrode, a membrane,
wherein at least one of the positive electrode and the negative electrode is the composite electrode [electrode (CE)] according to claim 12.

* * * * *